No. 784,485. PATENTED MAR. 7, 1905.
W. L. GARRELS & C. KIMBALL.
MOTOR VEHICLE.
APPLICATION FILED JAN. 17, 1900.

4 SHEETS—SHEET 1.

Witnesses:

Inventors:

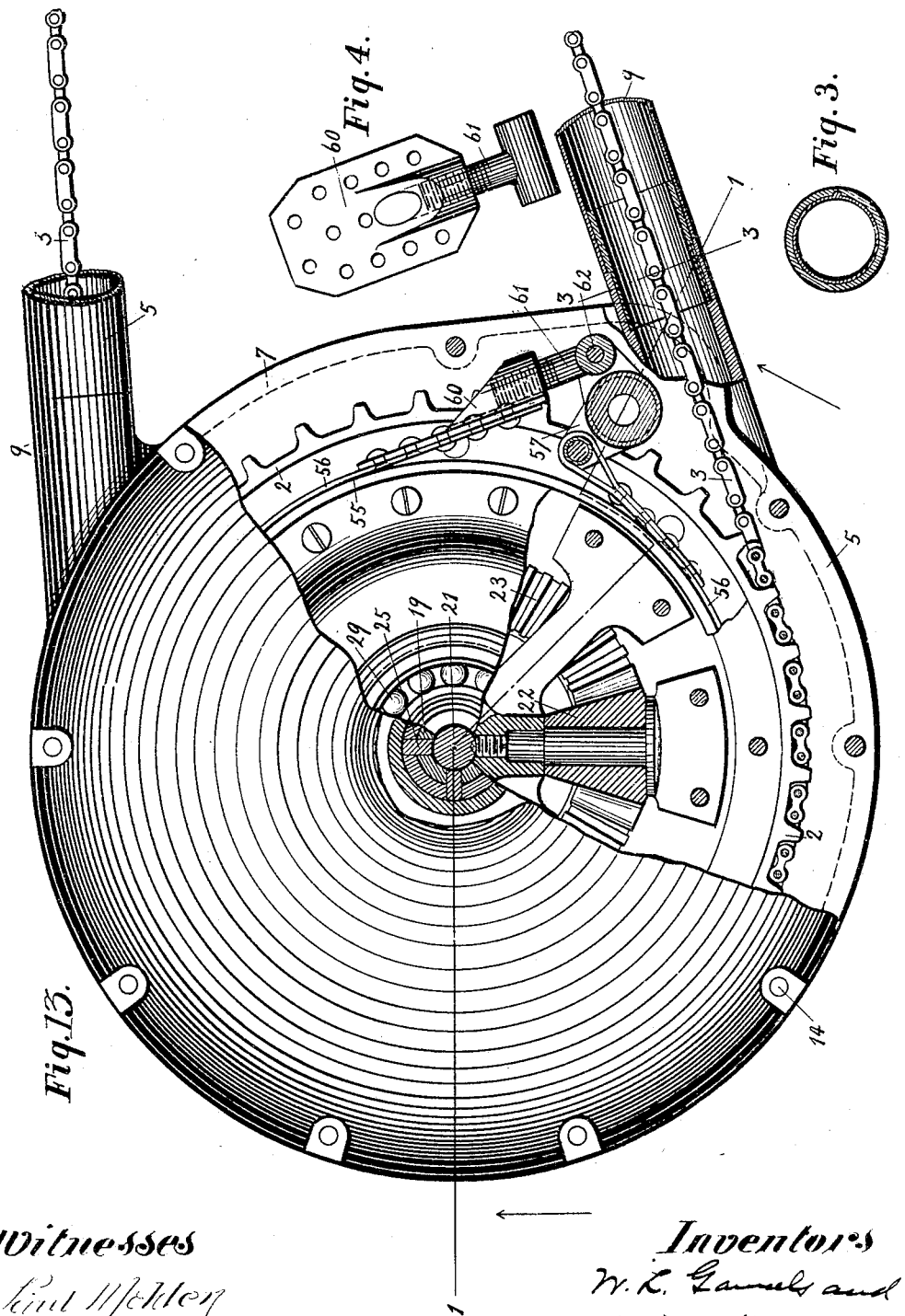

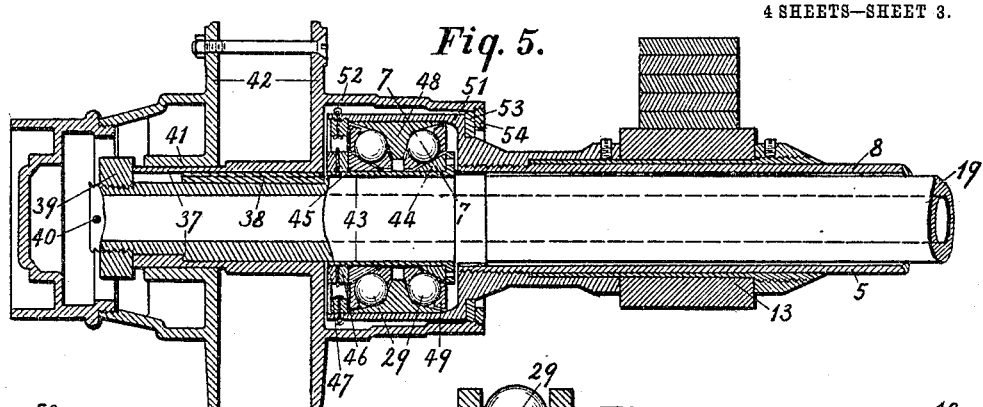
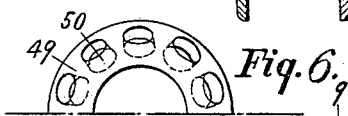
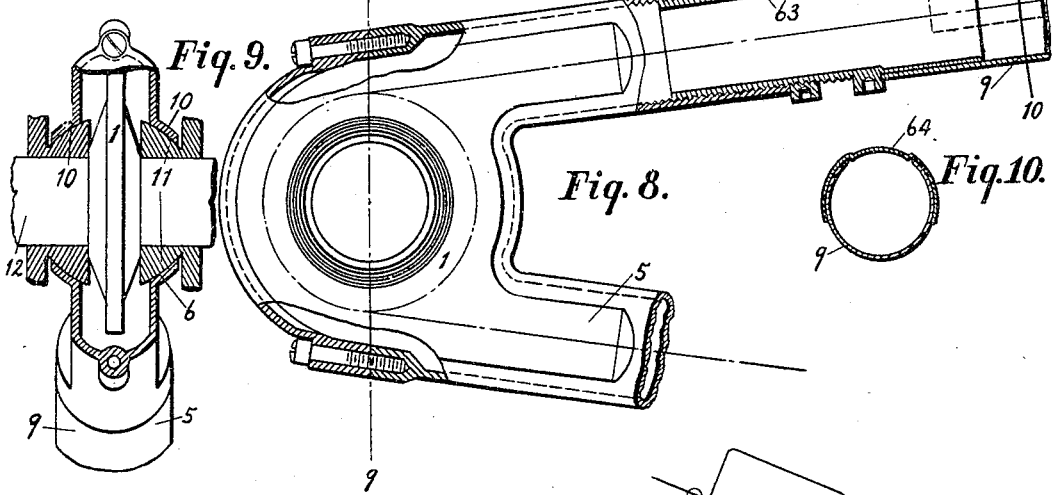
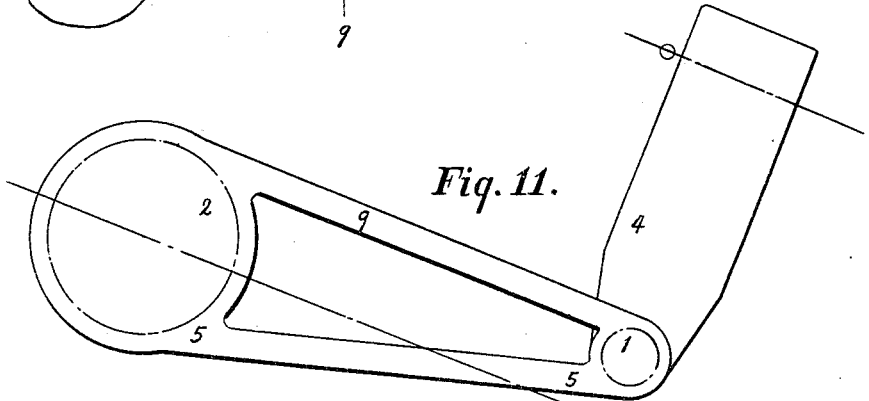

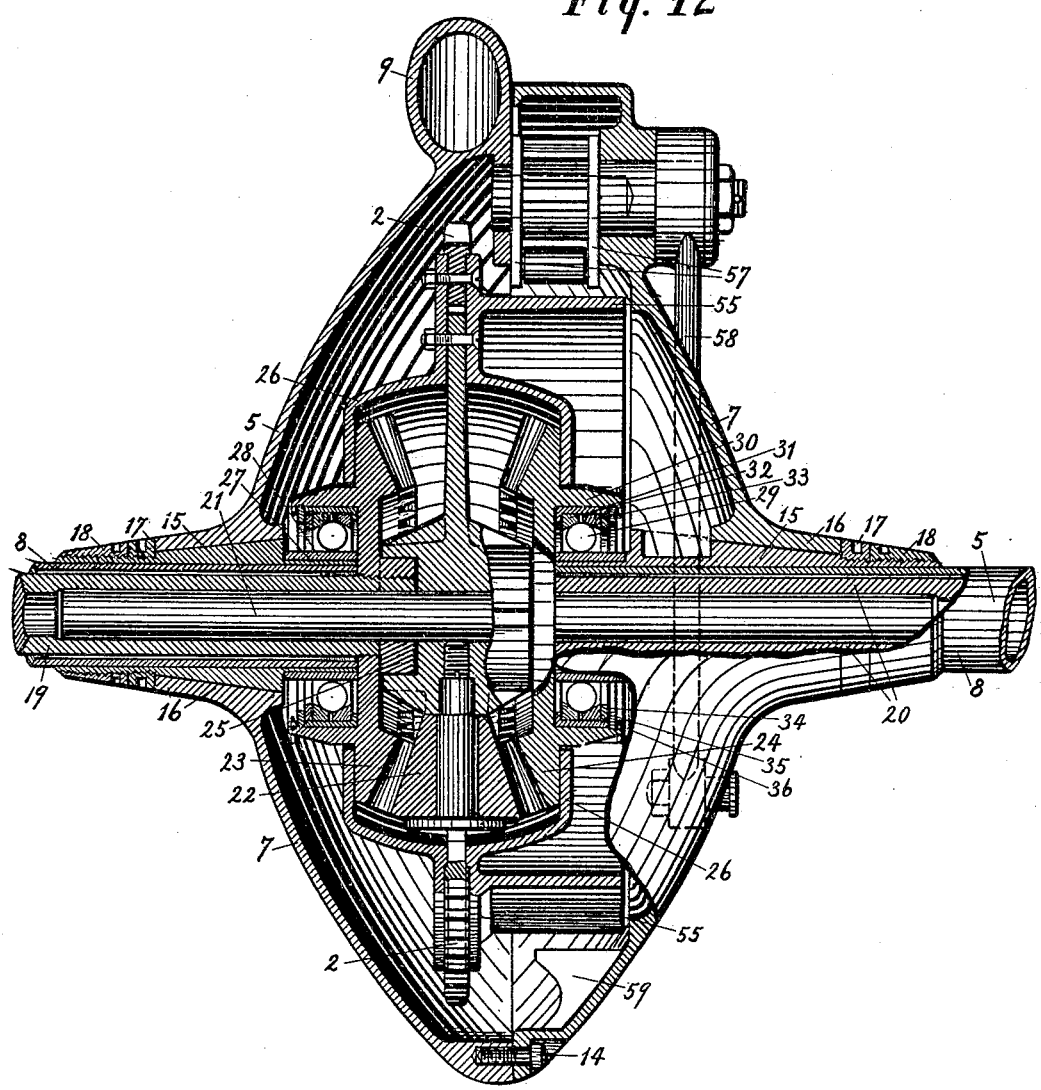

No. 784,485.

Patented March 7, 1905.

UNITED STATES PATENT OFFICE.

WILLIAM L. GARRELS, OF ST. LOUIS, AND CLINTON KIMBALL, OF KIRKWOOD, MISSOURI.

MOTOR-VEHICLE.

SPECIFICATION forming part of Letters Patent No. 784,485, dated March 7, 1905.

Application filed January 17, 1900. Serial No. 1,741.

*To all whom it may concern:*

Be it known that we, WILLIAM L. GARRELS, a resident of the city of St. Louis, and CLINTON KIMBALL, a resident of the city of Kirkwood, St. Louis county, Missouri, both citizens of the United States, have invented a new and useful Improvement in Motor-Vehicles, of which the following is a specification.

The principal objects are to protect the driving and transmitting mechanism from exposure to the dust and dirt and from the liability to do and receive injury.

Another object is to make the protecting-casing serve to strengthen the framework.

Other objects are to form a chain-adjustment and to minimize the friction at all bearing-points and generally to improve and strengthen the construction.

Figure 1:
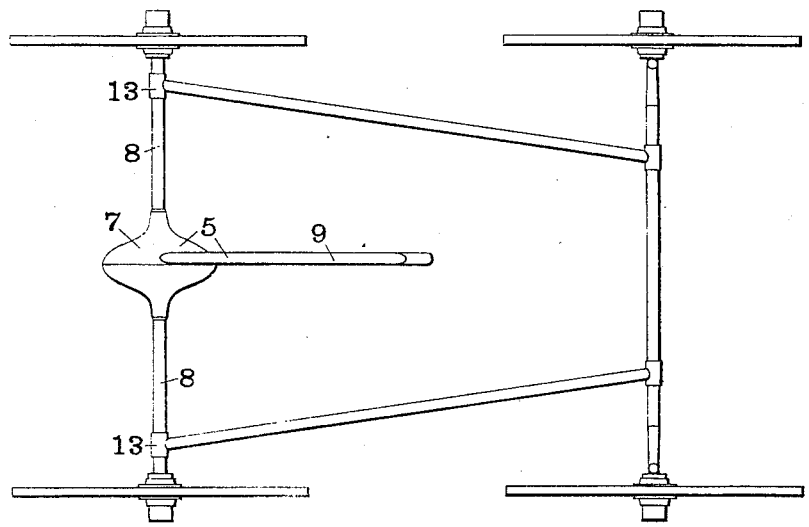
Figure 2:
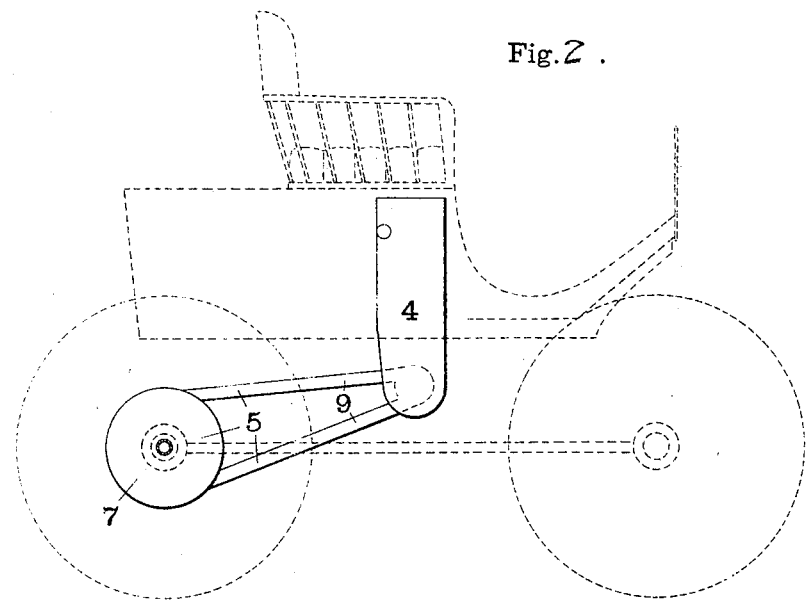

In the accompanying drawings, which form part of this specification, and wherein like symbols refer to like parts wherever they occur, Figure 1 is a plan view showing the axle portion of our casing. Fig. 2 is a side view showing the casing in place on a vehicle. Fig. 3 is a detail section of the chain-case on the line 3 3 of Fig. 13. Fig. 4 is a detail showing the adjusting device for fastening the friction-band to the bell-crank lever. Fig. 5 is a vertical section of the outer portion of the rear axle and its casing, showing form of ball-bearing used. Fig. 6 is a detail view of a ball-retaining ring. Fig. 7 is a sectional detail of the same on the line 7 7 of Fig. 5. Fig. 8 is a detail of the chain-case. Fig. 9 is a vertical section thereof on the line 9 9 of Fig. 8, showing its universal-joint connection to the engine or casing. Fig. 10 is a sectional detail on the line 10 10 of Fig. 8 of the chain-case. Fig. 11 is a diagrammatic view of the entire casing. Fig. 12 is a section of the central portion of the casing for the rear axle and the mechanism inside thereof, taken on the line 1 1 of Fig. 13 and altering in the directions of the arrows. Fig. 13 is a vertical view of the central portion of the casing for the rear axle or with a part thereof broken away to expose the mechanism of said casing and showing parts of said mechanism in section.

The main features of our driving mechanism consist of an engine mounted on the body of a vehicle and carrying a sprocket-wheel 1, a rear axle, to which the rear wheels are rigidly secured to turn therewith, a sprocket-wheel 2, operatively connected to the rear axle, and a sprocket-chain 3, connecting said sprocket-wheels. The casing for the driving mechanism comprises two main portions, one portion, 4, mounted on the body of the vehicle and the other, 5, mounted on the running-gear and connected to said first-mentioned portion by a ball-and-socket joint 6. The engine is preferably pivotally suspended from the vehicle-body to permit it to swing forward and backward, and in order that the casing may move with the engine it is attached to the engine-frame or suspended from pivots in axial alinement with the engine-frame pivots. The second member of the casing comprises an enlarged central portion 7, adapted to incase the axle-sprocket 2 and its adjunctive devices, and tubular extensions 8 on each side, adapted to incase the axle. This second member also comprises a casing 9 for the driving-chain and the lower portion of the engine not incased by the first member. In order to allow for the varying positions of the two members of the casing, they are united by a ball-and-socket joint. For this purpose spherical flanges 10 are formed on the axle member to fit over spherical bosses or trunnions 11, formed on the engine-frame concentric with the engine-shaft 12, which carries the driving sprocket-wheel 1. Obviously the universal joint might be formed directly between the two members of the casing. In each case the two members are free to conform to the position of the vehicle-body or running-gear, according as the member is mounted on one or the other. It is obvious that universal joints may be used in the tubes of the chain-case in lieu of the ball-and-socket joint above described. The lower member of the casing constitutes a portion of the frame of the running-gear. For this purpose the tubular extensions 8 are rigidly fixed to the enlarged central portion 7 and have swivel connections 13 with the side-bars of the running-gear, whereby the casing may swing up and down to conform to the position of the driving sprocket-wheel. The enlarged central portion is made of two parts whose meeting line is transverse to the axle. These two parts are held firmly together by means of screws 14; but in order that this central portion, together with its tubular extension, may be strong enough as a beam to constitute the rear portion of the frame of the running-gear a conical sleeve 15 of considerable length is mounted on each tubular extension and each of the two parts has a tubular boss 16 of outwardly-decreasing bore fitted over the corresponding sleeve. The sleeve and boss thus have a large bearing and are fastened together by any suitable means. Each sleeve is extended beyond its boss and threaded, and a nut 17 working thereon forces the inclined bore of the boss firmly against the inclined surface of the sleeve. A second nut 18 jams against and locks the first nut.

In order to provide for the turning of the vehicle, we employ a divided axle and connect the sections 19 20 thereof to the driving mechanism by a differential or compensating gear. For this purpose the axle sprocket-wheel 2 is fixed on a spindle 21, whose ends fit into the bores of the respective axle-sections 19 20. The sprocket-wheel 2 carries a plurality of conical or beveled gears 22, mounted radially thereon and within the circle of the sprocket-teeth. The beveled gears are arranged between the mesh, with bevel-gears 23 24 fixed on the two axle-sections. By this arrangement the power transmitted from the engine to the axle-sprocket is applied to the two axle-sections simultaneously, the sprocket bevel-gears 22 normally acting merely as pins or keys for connecting the sprocket-wheel to the bevel-gears 23 24 of the axle-sections and not moving on their own axis. If, however, as in turning the vehicle, one axle-section offers a greater resistance than the other section, the sprocket bevel-gears 22 rotate on their axes. The result of such rotation is that one side of each of the sprocket bevel-gears is moving in the same direction as the sprocket-wheel, while the opposite side moves in the opposite direction, and as the axle-gears are on opposite sides of the sprocket bevel-gears the rotation of one of said axle-gears is more rapid than that of the other. In order to secure a great degree of strength, the bevel-gears have their hubs elongated and screw-threaded to their respective axle-sections and secured by means of keys 25. The hub of the sprocket-wheel has an annular projection at each end fitting over the extending end of the axle-gear, whereby the keys 25 are covered and prevented from being displaced. The width of the hub serves to brace the sprocket-wheel. Longitudinal ribs on said hub serve to further strengthen the construction, and similar ribs are preferably arranged on the inside of the large central portion of the casing to give rigidity thereto. The sprocket-wheel also has mounted on each side an annular plate 26, which is offset and lies close outside of the respective bevel-gears of the axle-sections, and therefore forms a casing and backing therefor.

In order to provide a suitable bearing, the inner end of the sleeve 15 on the axle-casing has a cylindrical extension 27, upon which is fitted a cylindrical hardened ring 28, constituting the inner bearing for a series of balls 29, but free to slide circumferentially. An annular rib 30 concentric with the axle is formed on the outer face of the axle bevel-gear and constitutes the casing for the ball-bearing. This casing has a sleeve or lining 31 fitted therein, with a flange at its inner end, and inside of this lining are two hardened bearing-rings 32 33, free to turn in the lining. Spacing-rings of the construction hereinafter described in connection with the outer bearing may be used for the purpose of keeping the balls properly distanced and to retain the fragments in case of breakage. In order to adjust the bearing, the lining-sleeve 31 is screw-threaded and has an adjusting-nut 34 working therein, and a second nut 35, which locks the first, works in the threaded end of the hub of the bevel-gear 23 24, which constitutes the casing. This last-mentioned nut is preferably held in place by a cotter-pin 36. Thus all parts of the bearing may remain properly assembled even if the axle-casing and gear-casing are removed. In case any of the balls should break its fragments are caged, so that they cannot get into contact with the driving mechanism, and if such fragments get wedged or bound against any of the hardened bearing-rings said rings will turn, acting like an ordinary bearing.

On the outer end of each axle-section a sleeve 37 is fitted and fastened by a key 38. The endmost portion of the axle-section is reduced to form a shoulder for a shoulder in said sleeve to abut against and is threaded to receive a nut 39 for forcing the sleeve-shoulder against such abutment, the nut being guarded by a cotter-pin 40. A second sleeve 41 is fitted on said first-mentioned sleeve 37, and both of these have annular webs 42, between which the spokes of the wheel are firmly clamped or fastened, whereby said sleeves with their webs constitute the hub of the wheel.

The outer bearing of the axle is not inside of the hub, as usual, but lies alongside of the hub and between it and the driving mechanism, permitting the use of large balls. This bearing consists of a sleeve 43, fitted on the axle and abutting against a ring fixed on the axle for this purpose. A hardened bearing-ring 44 is fitted on the inner end of this sleeve and rests against a flange thereon and constitutes the inner bearing for a series of balls 29. A reversely-turned hardened bearing-ring 45 is arranged at the other end of the sleeve to constitute the inner bearing for a parallel series of balls and is adjusted lengthwise of the sleeve by a nut 46, which is locked by a second nut 47. The outer bearing for the two series of balls is formed by a ring 48, whose inner face at each end is concaved or beveled at two different angles, so that a ball will bear against the same at two points. The balls of each series are spaced or distanced from each other by means of rings or separators 49. These rings are provided with holes 50 to receive the balls and let said balls project through into contact with the bearing-surfaces. This spacing-ring is of such size and shape as to clear the bearings. The three hardened bearing-rings are free to turn in case a ball should break, as hereinbefore explained. The outer bearing-ring is fitted into a cylindrical box or case 51, rigidly fixed on the end of the axle-casing by means of a threaded sleeve forming part of said box and working on a thread on said axle-casing and pinned or keyed to said casing. The bearing is protected from dust by means of a cylindrical projection 52 from the hub of the wheel which incases the box. A felt or other suitable washer 53 is fitted into this incasing projection to lie against the end of the box and is kept in place by a nut or threaded ring 54, working on a thread in the incasing projection.

It is preferable to use a spacing-ring or ball-retainer in the bearings at the inner ends of the section of the rear axle as well as the bearing at the outer end, but to avoid confusion in the drawings such spacing-rings are not shown in Fig. 1.

The bearings for the front axle are similar to those of the rear axle, except that it is preferable to arrange one series of balls inside of each wheel instead of having two series of balls on the inner side of the wheel.

The brake mechanism comprises a drum 55, mounted on the axle-driving sprocket-wheel and a friction-band 56 around said drum. The ends of the friction-band are fastened to the ends of a bell-crank lever 57, arranged to tighten or loosen both ends of the band simultaneously. This bell-crank lever has a lever-arm 58 fastened thereto, and the lever-arm is connected through suitable connecting devices to a hand-lever or other suitable device conveniently located for the manipulation of the operator. In order to strip the friction-band from the drum, the case inclosing it has ribs 59 arranged thereon to project close to the band or the case itself fits close to said band. This construction fixes a limit beyond which the band cannot spread or buckle when it is loosened, and consequently the tendency to spread is distributed all the way along the band. In order to provide a convenient means of adjusting the length of the band, a plate 60, having a threaded hole in its end and a threaded bolt 61 working therein, is fastened to the end of said band. This bolt has a tubular cross-head which fits between the bifurcated ends of the bell-crank lever in alinement with perforations therein. A pin 62, extending through said perforations and tubular bolt-head, fastens said band to said bell-crank lever. When it is desired to adjust the length of the band, the pin 62 is withdrawn and the bolt screwed inwardly or outwardly in said threaded hole.

The tubular casing for the sprocket-chain is made adjustable in length by inserting therein a shouldered sleeve or section 63, which is screw-threaded into one section of said casing and is adapted to turn freely in the section in alinement therewith. The exposed portion of the sleeve is made of angular section or is otherwise adapted to be turned, and thereby shorten or elongate the chain-casing. In order to render the chain easily accessible, a portion of the tubular casing is cut away at the top. A sheet 64, of spring-steel or other suitable metal, is shaped to fit into the opening thus formed and has side and end extensions curved to conform to the remaining portions of the tubular casing. This sheet is sprung or snapped into position and is firmly held in place by its own resiliency.

Among the more important advantages of our invention are the strength and compactness of our construction throughout. Contributory to these are the interlocking of the hubs of the driven sprocket-wheel and of the axle-gear and the arrangement of the angle-plates mounted on said sprocket-wheel to prevent the spreading of said bevel-gears; also, the arrangement of the bearings to permit the use of large balls and also the using of extensive bearing-surfaces and the other devices for giving rigidity to the entire axle-casing, whereby it constitutes a strong beam from wheel to wheel. Another advantage of great importance is that the axle-casing constitutes a part of the running-gear. Another advantage is that the entire gear-casing, although rigid, accommodates itself automatically to all the changes in the relative positions of the running-gear and vehicle-body. In addition to these advantages are the advantages of adjustability of the chain-case, accessibility of the chain, facility of assembling and disassembling the parts of the casing, and other advantages of less importance.

Our invention admits of considerable modification, and we do not wish to restrict ourselves to the specific devices hereinbefore described.

It is noted that we have filed another application, Serial No. 22,810, filed July 7, 1900, which covers matter herein partially disclosed, but not fully and specifically claimed herein.

What we claim is—

1. A motor-vehicle comprising a body, a motor carried thereby, a divided rear axle operatively connected to said motor to be driven thereby, a compensating gear in said connecting devices and between the sections of said axle, and a gear-casing comprising a central portion incasing said compensating gear and tubular extensions rigidly fixed thereto for incasing the axle-sections and a portion extending from said central portion to said motor for incasing the power-transmitting mechanism, said casing being swiveled to and forming part of the running-gear, to permit the parts connecting said motor to said axle to conform to the position of said body and being connected to said motor by means of an intervening universal joint, substantially as described.

2. A gear-case for the actuating mechanism of motor-vehicles, comprising two members and an intervening universal joint, substantially as described.

3. A gear-case for the actuating mechanism of motor-vehicles comprising a member mounted on the vehicle-body and adapted to incase the motor, and a member mounted on the running-gear and forming part thereof, and a universal joint between said members, substantially as described.

4. A gear-case for the actuating mechanism of motor-vehicles comprising a member mounted on the vehicle-body and adapted to incase the motor, and a member swiveled to the running-gear and forming part thereof, and a universal joint between said members, substantially as described.

5. A gear-case for the actuating mechanism of motor-vehicles comprising a member mounted on the vehicle-body and adapted to incase the motor, and a member mounted on the running-gear and forming part thereof, said last-mentioned member having a ball-and-socket connection with said first-mentioned member or with the frame of the motor incased thereby, substantially as and for the purpose set forth.

6. In a motor-vehicle, a case for inclosing the power-transmitting mechanism, and a universal joint for said case, said case being arranged to protect the mechanism and said joint being arranged to prevent flexure of the parts of the case, substantially as described.

7. In a motor-vehicle, a chain-case comprising two members operatively connected to a motor-driven sprocket and to a sprocket to be driven thereby, and a universal joint between said members, substantially as described.

8. In a motor-vehicle, a chain-case, connections therefor to a motor-driven sprocket and to a sprocket to be driven thereby, said connections comprising a swivel-joint and a universal joint, substantially as described.

9. In a motor-vehicle, an adjustable chain-case operatively connected to the motor-sprocket and to a sprocket to be driven thereby, said case being adapted to act as a compression member, substantially as described.

10. A chain-case comprising a tubular frame and a threaded tubular sleeve for connecting the parts thereof, said sleeve being adapted to lengthen or shorten said case, substantially as and for the purpose set forth.

11. In a motor-vehicle a chain-case comprising a tubular frame having an elongated slot therein and a cover for said slot, said frame being adapted to act as a compression member, substantially as described.

12. In a motor-vehicle a chain-case comprising a tubular frame having an elongated slot therein and a cover therefor consisting of a sheet of resilient metal adapted to fit therein and having extensions for clamping the frame, substantially as described.

13. In a motor-vehicle, provided with driving mechanism and brake mechanism, a case for said mechanisms, said case having ribs or portions extending close to the brake-drum to coöperate in stripping the brake-band from the brake-drum, substantially as described.

14. A motor-vehicle having a chain-driven axle, a casing for said axle, said vehicle comprising a member extending from said axle-casing to the motor shaft or frame and inclosing said chain, said member comprising means for adjusting the length thereof and said motor being mounted to permit such adjustment without flexing the parts thereof, substantially as described.

WILLIAM L. GARRELS.
CLINTON KIMBALL.

In presence of—
WILLIAM P. CARR,
T. PERCY CARR.